Oct. 29, 1968  F. H. NEALON  3,407,503
APPARATUS FOR RESTORATIVE DENTISTRY
Original Filed Jan. 5, 1965
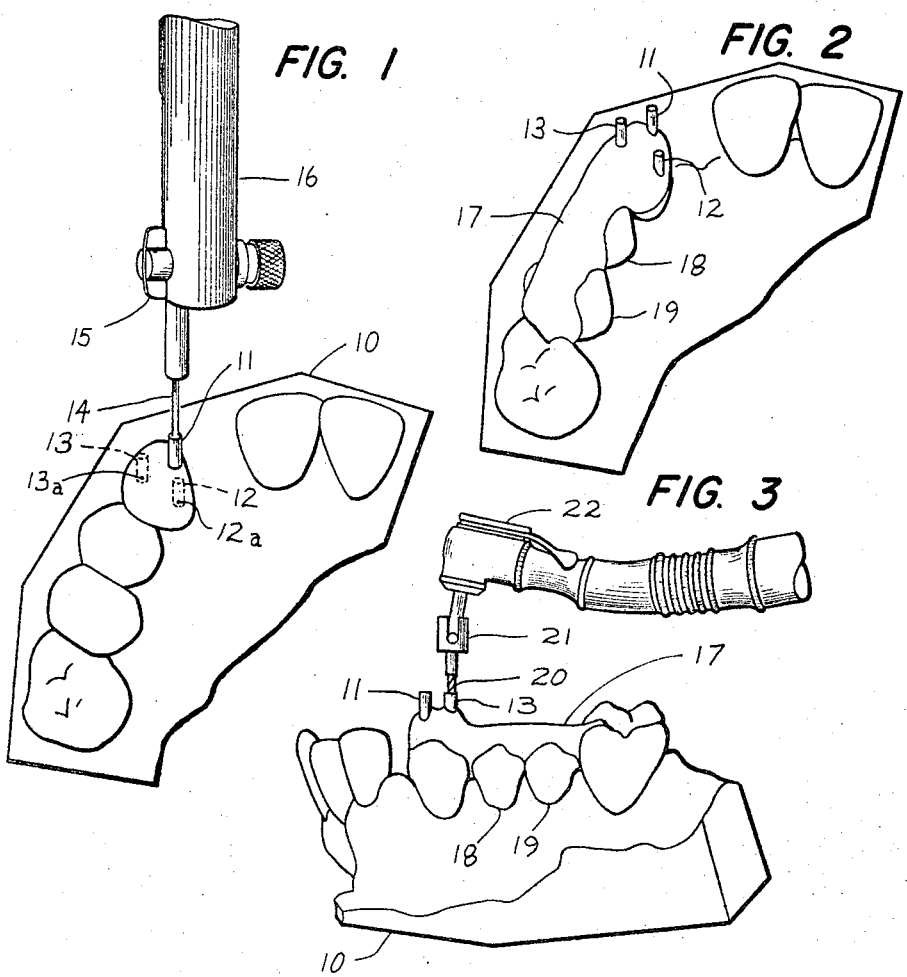
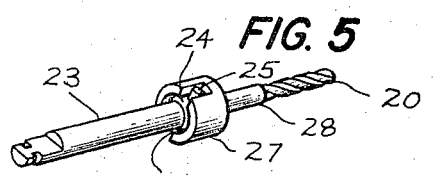
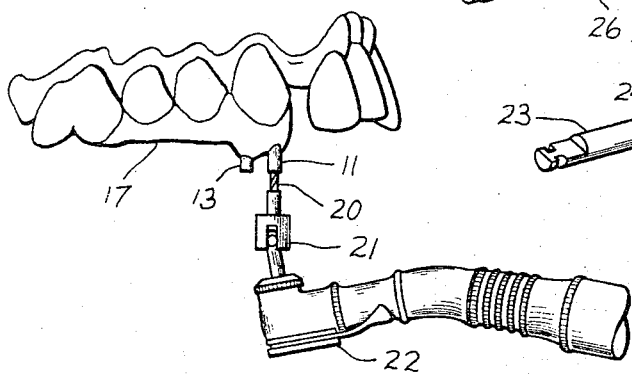
INVENTOR.
FRANK H. NEALON
BY
ATTORNEY

# United States Patent Office 3,407,503
Patented Oct. 29, 1968

3,407,503
APPARATUS FOR RESTORATIVE DENTISTRY
Frank H. Nealon, Lakewood, Ohio, assignor to The J. M. Ney Company, Bloomfield, Conn., a corporation of Connecticut
Original application Jan. 5, 1965, Ser. No. 423,484, now Patent No. 3,376,643, dated Apr. 9, 1968. Divided and this application Nov. 7, 1967, Ser. No. 681,235
2 Claims. (Cl. 32—67)

ABSTRACT OF THE DISCLOSURE

There is disclosed apparatus for drilling parallel holes in a patient's teeth for purposes of mounting a restorative device. The apparatus includes a negative impression for placement on the patient's teeth with tubular bushings situated so as to be disposed over the desired location for the holes in the patient's teeth. A drill unit includes a shaft for attachment to a driving member, a cooperating member which is adapted to be driven by the shaft about an axis of rotation angularly disposed with respect to the rotational axis of the shaft and a drill which is receivably within the tubular bushings so as to be guided thereby in drilling holes therethrough into the patient's teeth.

Cross-reference to related application

This application is a division of copending application Ser. No. 423,484, filed Jan. 5, 1965, now Patent No. 3,376,643, entitled Method for Restorative Dentistry.

Background of the invention

The use of multiple, spaced parallel holes in a patent's teeth for the retention of cast dental restorations having aligned parallel pins which are received in the parallel holes has been known in the prior art and employed where it is desirable to avail of its advantages. This general technic has the desirable features of offering positive retention of the restorative device, conservation of tooth structure of the teeth involved and improved aesthetics. Of the several methods and procedures which have been devised to carry out this technic, a number involve the use of instrumentation and devices which are secured in a patient's mouth to assure parallel alignment of a conventional hand drill to prepare the patient's teeth and drill spaced parallel holes for the reception of a restorative device having identically spaced and aligned parallel pins. In prior art methods a negative impression was then taken of the patient's teeth including the parallel holes therein and an appropriate restorative dental device prepared and fabricated from such negative impression, usually at a dental laboratory equipped to fabricate such restorative dental devices which may take the form of gold castings, for example.

One type of prior art device which was secured in a patient's mouth to assure the parallel alignment of holes drilled with a conventional dental drill handpiece, provided a movable guide means adapted to receive the dental drill and permit only one angular disposition of the drill and the handpiece driven by it. Moreover, in prior art technics and procedures, the parallel holes were first drilled in the patient's teeth, a negative impression taken of the prepared teeth, and then the restorative device was fabricated at a dental laboratory from such negative impression. Accordingly, the process of fabrication of the restorative device may take several days or frequently more and during such time there is an ever-present danger that the prepared parallel holes in the patient's teeth may be exposed to foreign material, bacteria, infection or other undesirable complications. As is evident to those skilled in the art, prior art apparatus presently known to the profession often has relatively cumbersome and awkward aspects in use, in addition to requiring considerable experience with a particular type of instrumentation for drilling parallel cavities to develop the highest skillfulness in its use and thereby assure the desirable advantages of the parallel pin type of restorative dentistry.

In Bruce—"Parallel-Pin Splints for Periodontally Involved Teeth" The Journal of Prosthetic Dentistry, July-August 1964, pages 739–745, there is disclosed a procedure for making parallel pin splints similar in some respects to the method disclosure herein. Similarly, in Harris Patent 3,231,977 there is disclosed another method for making parallel pin splints which is related to that employed herein. However, neither of these procedures suggests the preferred technic which is claimed in copending application 423,484 first establishing the desired location for the parallel pins upon the patient's teeth and thereafter taking the negative impression.

A principal object of the invention is to devise a means for drilling parallel holes in at least one of the patient's teeth with a high degree of accuracy for receiving the parallel pins of a restorative dental device having pins disposed in exact parallelism for retention on a patient's teeth.

Another object of the present invention is to provide an improved and novel drill which is especially adapted for use with guide means especially fitted to and precisely positioned upon a patient's teeth for the drilling and preparation of parallel holes to receive the parallel pins of a restorative device therein.

Summary of the invention

It has now been found that the foregoing and related objects can be readily obtained in apparatus for drilling parallel holes in a patient's teeth by use of a combination comprising a negative impression for placement on the patient's teeth and including tubular bushings positioned in parallel relationship therein for disposition over the desired location for the parallel holes in the patient's teeth. The drill unit used therewith includes a shaft adapted to be removably attached to a driving member and having an enlarged end portion with means extending therefrom radially disposed relative to the major axis of the shaft. A cooperating member means having a configuration receiving the extending means and drivingly engaged therewith for rotation about an axis angularly disposed with respect to the axis of rotation of the shaft. The cooperating member includes retaining means which receives a drill extending outwardly therefrom, and the drill is of a diameter receivable within the tubular bushings so as to be guided thereby in parallel relationship when drilling therethrough into the patient's teeth.

Brief description of the drawings

FIGURE 1 is a perspective view of tubular bushings being aligned in parallel relationship over preestablished locations on a positive model of a patient's teeth;

FIGURE 2 is a perspective view of a matrix having a plurality of parallel aligned bushings affixed thereto and forming a common removable negative impression of the model of the patient's teeth shown in FIGURE 1 including several approximate teeth;

FIGURE 3 is a perspective view illustrating the step of drilling parallel holes in a model of a patient's teeth employing the flexible coupling of the present invention and the matrix base supporting the parallel tubular bushings as shown in FIGURE 2;

FIGURE 4 is a view of the matrix including the parallel tubular bushings as shown in FIGURES 2 and 3 fitted to a patient's teeth for drilling of parallel pin holes with the flexible coupling illustrated in detail in FIGURES 5 and 5a;

FIGURE 5 is a perspective view of the flexible coupling assembly of the present invention; and, FIGURE 5a is an exploded perspective view of the elements comprising the flexible coupling assembly of the present invention.

Description of the preferred embodiments

In forming the negative impressions containing the tubular bushings positioned in parallel relationship the preferred procedure for the present invention consists of the dentist establishing the desired location for parallel holes on at least one of the teeth which are being prepared to receive a restorative dental device. This may be done by making a small indentation on such tooth or teeth using a burr on the enamel, for instance. The dentist then takes an impression of the patient's teeth which is sent to a dental laboratory. There a model of the patient's teeth including the preestablished desired location for parallel holes is formed from the negative impression. Such a model is shown in partial view in FIGURE 1, generally indicated at 10. Suitable instrumentation such as the Ney Surveyor is then employed to align tubular bushings as shown at 11 in parallel relationship at the desired angle and over the preestablished desired locations as indicated at 11a, 12a and 13a. This is accomplished by placing the model in the survey table and aligning pin 14 in the spindle 15 of the surveyor 16. The surveyor table (not shown) is tilted so that the aligning pin 14 is angularly disposed with respect to the model at the desired angle that the parallel holes will take. A drill bushing such as that shown at 11 is placed on the aligning pin and brought to position over the preestablished desired location for one of the several parallel holes. The bushing 11, which is a hollow tubular sleeve, is secured to the model 10 with a small amount of sticky wax. Additional bushings are then secured to the model 10 for additional parallel holes as desired by aligning the aligning pin 14 of the surveyor 16 over the additional preestablished desired locations for parallel holes. Such additional bushings are shown in phantom outline at 12 and 13.

As shown in FIGURE 2 an appropriate base is formed over several approximate teeth including the parallel aligned bushings 11, 12 and 13 by applying a suitable material such as a quick curing acrylic, for example. Such a base is in effect a matrix and includes an index formed from the occlusal surfaces of several of the approximating teeth such as 18 and 19 as shown in FIGURE 2.

Parallel holes are then drilled into the model 10 as shown in FIGURE 3 preferably by use of the drill assembly of the present invention. As shown, the drill is inserted into each of the parallel aligned tubular bushings 11, 12 and 13 and driven through a flexible coupling 21 fitted to a conventional handpiece 22. The flexible coupling 21 is so conceived in accordance with the present invention that it allows limited angular deviation of the driving means such as the handpiece 22 with respect to the driven drill 20 without impairing the parallelism of the drilled holes which are guidingly drilled in the model 10 through the parallel aligned bushings 12 and 13. The use of such a flexible coupling obviates much of the criticality of drilling in parallelism since the drill 20 is free to follow the predetermined alignment of the parallel tubular bushings 11, 12 and 13 without binding or undue friction, regardless of the fact that the handpiece 22 may deviate angularly as much as twenty degrees with respect to the alignment of the driven drill 20.

After the parallel holes have been drilled in the model 10 in the manner described, the base 17 is removed from the model and a restorative device fabricated including parallel pins spaced and aligned in parallelism in accordance with the parallel pin holes drilled in the model. Such a restorative device may typically comprise fixed bridgework or periodontal splints formed of cast gold. The restorative device together with the matrix base 17 including the parallel positioned hollow tubular bushings 11, 12 and 13 are then forwarded to the dentist. The index formed by the inclusion of the occlusal surfaces of several of the approximating teeth on the matrix base 17 provide a means of precisely positioning the base 17 in the patient's mouth upon his teeth so that the parallel bushings 11, 12 and 13 are exactly aligned over the desired location of the parallel pin holes.

As shown in FIGURE 4, holes are then drilled by the use of a drill 20 embodying the present invention and driven by a flexible coupling 21 of the type previously described in connection with FIGURE 3 by means of a conventional dental drilling apparatus such as the handpiece 22. Upon completion of the drilling and preparation procedure, the restorative device is affixed to the patient's teeth by insertion of the parallel pins into the drilled parallel holes which are aligned and spaced in accordance with the disposition of the pins of the restorative device. Thus, it may be seen that in accordance with the concept of the present invention, the drilling of the parallel holes for retention of the restorative device may be accomplished immediately preceding the fitting of the restorative device to the patient's teeth. This procedure has the advantage of eliminating any unwanted exposure of drilled cavaties to foreign material, bacterial action or other dangers.

A preferred embodiment of the flexible coupling conceived by the present invention is shown in FIGURE 5 in an assembled perspective view. As illustrated in FIGURE 5 the flexible coupling assembly comprises a shaft 23 shaped and adapted to be removably attached to a driving member such as the handpiece 22 as shown in FIGURE 3 of conventional dental drilling equipment. The shaft 23 has an enlarged portion shown generally at 24 and means extending from the enlarged portion and being radially disposed relative to the major axis of the shaft 23. A cooperating member 26 is configured to receive the extending means 25 and 26 so as to be drivable about an axis of rotation which may be angularly disposed in slight deviation with respect to the axis of rotation of the shaft 23. Additionally, the assembly of FIGURE 5, and more particularly the cooperating member 27, includes means to receive and hold a drill 20. The particular configuration of the elements of the flexible coupling assembly of FIGURE 5 may perhaps be seen more clearly in the exploded perspective view of FIGURE 5a wherein like members bear the same numerical designation. As seen in FIGURE 5a the shaft 23 has an enlarged end portion comprising a rounded end 24 of generally spherical shape and having a larger diameter than the shaft 23. Opposed pin members 25 and 26 extend radially from the rounded end portion 24 with respect to the major axis of the shaft 23. A cup-like member 27 is configured and dimensioned to receive the spherically shaped end portion 24 within its walls. Slots 29 and 30 in the walls of the cup-like member 27 receive and engage the opposed extending pins 25 and 26. Thus the rotational torque of the shaft 23 is transmitted through the pins 25 and 26 to the cup-like member 27 and thence to the drill 20 which is held and received in appropriate means 28 within the cup-like member 27.

As may be appreciated from the exploded perspective view of FIGURE 5a, the enlarged end portion 24 of the shaft 23, when seated in the cup-like member 27, allows and accommodates some angular misalignment of the shaft 23 with respect to the drill 20 without disturbing or changing the axis of rotation of the drill 20, the driving torque being transmitted through the radially extending pins 25 and 26. Thus the drill 20 may be guided in a desired drilling position in accordance with a particular alignment and drill a hole along the axis of such alignment though the shaft 23 deviates in its angular displacement with respect to the guided alignment of drill 20.

Although a conventional drill assembly may be used while the matrix base supporting the parallel tubular bushings is positioned on the model, the parallel holes preferably are drilled through the bushings even in this step by the use of a drill driven through a flexible coupling. Such a flexible coupling, in accordance with the concept of the present invention, permits deviation of the alignment of the driving member (which usually comprises the handpiece of dental drilling equipment) with respect to the drill. The alignment deviation may be as much as twenty degrees, yet the drill will precisely follow the prefixed alignment of the tubular bushing. This flexibility of alignment of the handpiece becomes particularly important when the dentist is drilling the holes in the patient's teeth through the bushings. Thus the criticality of the drilling technic is diminished and parallel holes are assured by reason of the virtual elimination of the possibility of the drill binding in the guiding means, i.e., the parallel aligned bushings.

Tubular bushings of varying lengths may be chosen so as to predetermine the maximum depth of each parallel hole to be drilled when used with a drill of known length. The restorative device fabricated and the removable negative impression including the parallel tubular bushings are sent by the laboratory to the dentist, who in turn fits the removable negative matrix impression including the bushings, over the patient's teeth preferably including several approximate teeth to assure perfect alignment of the parallel tubular bushings over the desired location of holes. The dentist then drills parallel holes in the patient's teeth at the desired locations by drilling through the bushing guides using a drill driven by a flexible coupling in the manner previously described in connection with the parallel holes drilled in the model of the patient's teeth. When such drilling procedure has been completed, the patient may immediately be fitted with the restorative device by insertion of the parallel pins of the device into the aligned parallel holes in the appropriate desired locations drilled as described above. Thus, the concept of the present invention eliminates the problem of drilled cavities being exposed to foreign material, bacteria, and other undesirable conditions over a period of time which was usually the case with prior art procedures. Moreover, in accordance with the method and procedure of the present invention, the patient undergoes considerably less discomfort in that the drilling and fitting necessary in accordance with the restorative procedure may be accomplished at one time. Additionally, as will be evident to those skilled in the art, the parallelism of the tubular bushings which guide the drill may be established in a dental laboratory under convenient and highly controlled conditions rather than being effected in the interior of the patient's mouth at a sitting in the dentist's office, thus assuring a higher degree of parallel alignment of both the tubular bushings and the restorative device which is made from the model of the patient's teeth including parallel holes drilled by the use of the prealigned parallel tubular bushings.

Thus, it can be seen that the present invention permits the determination of the alignment of parallelism of the guiding means for drilling parallel holes to be accomplished in a dental laboratory under controlled conditions and with appropriate instrumentation. Limited access and angular difficulties such as might be encountered in performing that work directly in the patient's mouth are largely eliminated. Moreover, different lengths of bushings may be selected for use with a drill of known length thereby predetermining the depth to which parallel holes will be drilled as desired. Accordingly, when a drill of a known length is to be used, a shorter tubular bushing will provide a shallower parallel hole with the same length drill. Similarly if tubular bushings of a uniform length are employed, the parallel holes drilled with a drill of known length will all be of the same controlled depth.

Thus, the present invention provides simple but highly effective apparatus for drilling parallel holes in a patient's teeth with a relative minimum of discomfort to the patient and without criticality in alignment of the handpiece. The flexible drive coupling may be fabricated relatively economically and simply and is adapted to use with drills of varying length.

Having thus described the invention, I claim:

1. In apparatus for drilling holes in a patient's teeth, the combination comprising a negative impression for placement on patient's teeth and including tubular bushings positioned in relationship therein for disposition over the desired location for the holes in the patient's teeth; and a drill unit including a shaft adapted to be removably attached to a driving member, said shaft having an enlarged end portion with means extending therefrom radially disposed relative to the major axis of said shaft, a cooperating member having a configuration receiving said extending means and drivingly engaged therewith for rotation about an axis angularly disposed with respect to the axis of rotation of said shaft, retaining means on said cooperating member, and a drill received by said retaining means and extending outwardly therefrom, said drill being of a diameter receivable within said tubular bushings for guided drilling therethrough.

2. The combination of claim 1 wherein said shaft enlarged portion is of substantially spherical configuration, wherein said radially extending means thereon are pins on opposite sides extending substantially normally to the axis of said shaft and wherein said cooperating member has a recess therein receiving said enlarged portion and radial slots in the wall thereof about said recess receiving said pins.

References Cited

UNITED STATES PATENTS

| | | | |
|---|---|---|---|
| 2,233,722 | 3/1941 | Weigele | 32—67 |
| 2,338,437 | 1/1944 | Karlstrom | 32—67 XR |

LOUIS G. MANCENE, *Primary Examiner.*

S. NATTER, *Assistant Examiner.*